(12) United States Patent
Igarashi

(10) Patent No.: US 11,991,375 B2
(45) Date of Patent: May 21, 2024

(54) MOVING IMAGE ENCODING DEVICE, MOVING IMAGE COMPRESSION DEVICE, MOVING IMAGE ENCODING METHOD, AND PROGRAM

(71) Applicant: NEC Corporation, Tokyo (JP)

(72) Inventor: Hiroaki Igarashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 227 days.

(21) Appl. No.: 17/441,832

(22) PCT Filed: Mar. 26, 2019

(86) PCT No.: PCT/JP2019/012871
§ 371 (c)(1),
(2) Date: Sep. 22, 2021

(87) PCT Pub. No.: WO2020/194507
PCT Pub. Date: Oct. 1, 2020

(65) Prior Publication Data
US 2022/0201319 A1    Jun. 23, 2022

(51) Int. Cl.
*H04N 19/196* (2014.01)
*H04N 19/136* (2014.01)
*H04N 19/159* (2014.01)
*H04N 19/176* (2014.01)

(52) U.S. Cl.
CPC ......... *H04N 19/196* (2014.11); *H04N 19/136* (2014.11); *H04N 19/159* (2014.11); *H04N 19/176* (2014.11)

(58) Field of Classification Search
CPC .. H04N 19/196; H04N 19/159; H04N 19/103; H04N 19/136; H04N 19/124; H04N 19/176; H04N 19/61; H04N 19/105; H04N 19/513; H04N 19/52; H04N 19/44; H04N 19/70; H04N 19/577; H04N 19/132
USPC ........................................................ 375/240
See application file for complete search history.

(56) References Cited

U.S. PATENT DOCUMENTS

| | | | |
|---|---|---|---|
| 2009/0067738 A1* | 3/2009 | Fuchie | H04N 19/146 382/251 |
| 2009/0323813 A1* | 12/2009 | Maciel de Faria | H04N 19/56 375/240.24 |

FOREIGN PATENT DOCUMENTS

| | | |
|---|---|---|
| JP | 2005-051659 A | 2/2005 |
| JP | 2009-071520 A | 4/2009 |
| JP | 2010-161818 A | 7/2010 |

OTHER PUBLICATIONS

International Search Report for PCT Application No. PCT/JP2019/012871, dated Jun. 18, 2019.

(Continued)

*Primary Examiner* — Masum Billah
(74) *Attorney, Agent, or Firm* — Sughrue Mion, PLLC

(57) ABSTRACT

A moving image encoding device includes: a parameter correction unit that corrects an encoding parameter for encoding a moving image; a block arrangement determination unit that determines block information used for encoding the moving image; and an encoding unit that encodes the moving image, the block arrangement determination unit acquires the corrected encoding parameter, and determines and outputs the block information, and the encoding unit encodes the moving image by using the encoding parameter before correction and the block information output by the block arrangement determination unit.

6 Claims, 10 Drawing Sheets

(56) References Cited

OTHER PUBLICATIONS

K. McCann et al., "High efficiency video coding (HEVC) test model 16 (HM16) improved encoder description", Joint Collaborative Team on Video Coding (JCT-VC) 19 th Meeting, Strasbourg, France, Oct. 17-24, 2014.
NVIDIA, "NVIDIA Video CODEC SDK" (https://developer.nvidia.com/nvidia-video-codec-sdk), retrieved on Dec. 20, 2018.
L.Haglund, "The SVT High Definition Multi Format Test Set", 2006.

* cited by examiner

MOVING IMAGE ENCODING DEVICE, MOVING IMAGE COMPRESSION DEVICE, MOVING IMAGE ENCODING METHOD, AND PROGRAM

This application is a National Stage Entry of PCT/JP2019/012871 filed on Mar. 26, 2019, the contents of all of which are incorporated herein by reference, in their entirety.

TECHNICAL FIELD

The present invention relates to a moving image encoding device, a moving image compression device, a moving image encoding method, and a program.

BACKGROUND ART

H.264/AVC (Advanced Video Codec) is widely used as a standard for compressing moving images. Also, H.265/HEVC (High Efficiency Video Codec) is known as a next-generation video compression standard for compressing high-resolution moving images such as 4K or 8K.

These moving image compression techniques include: (1) prediction processing, which reduces redundancy between frames or within a frame; (2) conversion and quantization processing, which reduces spatial redundancy by converting a spatial component of a predicted residual signal into a frequency component to quantize it; and (3) entropy encoding, which dynamically assigns variable length encoding according to the frequency of data occurrence.

The prediction processing uses two types of prediction, intra prediction, which reduces spatial redundancy within a frame, and inter prediction, which reduces temporal redundancy between frames. The inter prediction includes one-directional prediction and bidirectional prediction. In the one-directional prediction, frame prediction is performed using either a past frame or a future frame in a temporal manner. In the bidirectional prediction, frame prediction is performed using both a past frame and a future frame in a temporal manner. By using bidirectional prediction, it is possible to realize more accurate prediction than one-directional prediction, and the compression ratio improves as redundancy can be further reduced.

Further, since encoding is performed on the basis of blocks in AVC and HEVC mentioned above, the image of a single frame is divided into a plurality of blocks and processed. The block mode and block size can be selected from a plurality of modes and sizes. Therefore, a moving image encoding device needs to have a function of determining the block mode and block size of the intra prediction and inter prediction mentioned above.

Non-Patent Document 1 discloses a moving image encoding device intended for HEVC. FIG. 7 shows a moving image encoding device 1a disclosed in Non-Patent Document 1. The moving image encoding device 1a includes a block arrangement determination unit 10a and an encoding unit 20. The block arrangement determination unit 10a includes a bidirectional prediction unit 101, a unidirectional prediction unit 102 that performs forward prediction on the basis of a past frame, a unidirectional prediction unit 103 that performs backward prediction on the basis of a future frame, an intra prediction unit 104, and a block arrangement judgment unit 105a. Hereinafter, forward prediction may be referred to as unidirectional prediction 1, and backward prediction may be referred to as unidirectional prediction 2.

The block arrangement determination unit 10a determines the block mode and block size on a frame, receiving input of a video and a quantization parameter (QP), and outputs it as block information. Here, examples of the block mode such as bidirectional prediction, unidirectional prediction 1 which uses a past frame, unidirectional prediction 2 which uses a future frame, and intra prediction are shown; however, strictly speaking, the block mode is not limited to these examples according to the HEVC format, and the merge mode and skip mode can also be selected. The encoding unit 20 receives input of the block information (block mode and block size) output from the block arrangement judgment unit 105a, the QP, and the video, and encodes the video according to the block information.

FIG. 8 shows an operation example of the moving image encoding device disclosed in Non-Patent Document 1. First, the unidirectional prediction unit 102 receives input of a video and QP and performs unidirectional prediction 1, using a past frame (Step S1). Next, the unidirectional prediction unit 103 receives input of the video and QP and performs unidirectional prediction 2, using a future frame (Step S2). Next, the bidirectional prediction unit 101 receives input of the video and QP and performs bidirectional prediction, using a past frame and a future frame (Step S3). Next, the intra prediction unit 104 receives input of the video and QP and performs intra prediction (Step S4). Next, the block arrangement judgment unit 105a selects an optimum block mode and block size for each block (Step S5). For example, the block arrangement judgment unit 105a selects an optimum block mode and block size that minimizes RD cost J, which will be described later. Next, the encoding unit 20 receives input of the video and QP and encodes each block (Step S6). The encoding unit 20 outputs the encoded compressed data (bit stream). The order of the bidirectional prediction (Step S3), the unidirectional predictions (Step S1 and Step S2), and the intra prediction (Step S4) is not limited to this example, and parallel processing is also possible.

In general, the block arrangement (which block mode to be assigned to each block included in one frame, and how the block size is to be set) is determined by means of RD (Rate Distortion) optimization, taking into consideration the trade-off between image quality and bit rate. In RD optimization, a block mode and block size that minimize the RD cost J, which is expressed as Equation (1) below using the image quality deterioration D, bit rate R, and Lagrange multiplier $\lambda$, are used as an optimum solution.

$$J = D + \lambda R \tag{1}$$

The QP is a parameter used for quantization; however, it is also used to derive $\lambda$ in the RD optimization.

While bidirectional prediction can realize an even higher compression ratio, it is not an essential function of the moving image encoding device. Therefore, a moving image encoding device for consumer use, which is not required to be highly functional, may not include a bidirectional prediction function in some cases. For example, the NVENC, which is a hardware codec equipped in NVIDIA GPUs (Graphics Processing Unit) disclosed in Non-Patent Document 2, does not support bidirectional prediction on GPUs of the Volta generation and earlier. In order to realize a function of bidirectional prediction using the output of an encoding device that does not include bidirectional prediction, correction processing that realizes bidirectional prediction or transcoding for re-compression are required. FIG. 9 shows an example of a moving image encoding device that realizes corrective bidirectional prediction.

As shown in FIG. 9, the moving image encoding device 1b includes a block arrangement determination unit 10b, a correction unit 15b, and an encoding unit 20. Compared with the moving image encoding device 1a shown in FIG. 7, the moving image encoding device 1b differs in that the block arrangement determination unit 10b does not include the bidirectional prediction unit 101 and the unidirectional prediction unit 103 and that it includes the correction unit 15b. Other than that, the configuration is the same as that of the moving image encoding device 1a of FIG. 7.

The block arrangement determination unit 10b includes the unidirectional prediction unit 102, the intra prediction unit 104, and a block arrangement judgment unit 105b that selects a block mode of either the unidirectional prediction 1 or the intra prediction. The block arrangement judgment unit 105b outputs to the correction unit 15b information indicating either the unidirectional prediction 1 or the intra prediction and block information 1 including block size.

The correction unit 15b includes the bidirectional prediction unit 101, the unidirectional prediction unit 103, and a block arrangement judgment unit 106b. The block arrangement judgment unit 106b outputs to the encoding unit 20, the block information 1, the block mode indicating one that is selected from the unidirectional prediction 2 and the bidirectional prediction, and block information 2 including the block size.

FIG. 10 shows an operation example of the moving image encoding device 1b. In FIG. 10, the processing other than the unidirectional prediction 2, the bidirectional prediction, and the redetermination of block arrangement is similar to the operation example of the moving image encoding device 1a described with reference to FIG. 8 (Step S11 to Step S13). If the block information 1 output from the block arrangement determination unit 10b includes blocks of the unidirectional prediction 1 (Step S14; Yes), then in the correction unit 15b, the unidirectional prediction unit 103 performs the unidirectional prediction 2 in the correction unit 15b (Step S15) and the bidirectional prediction unit 101 performs the bidirectional prediction (Step S16). At this time, the bidirectional prediction unit 101 can use the processing results of the unidirectional prediction unit 102 and the unidirectional prediction unit 103.

The block arrangement judgment unit 106b of the correction unit 15b selects one of the unidirectional prediction 1, the unidirectional prediction 2, and the bidirectional prediction, and re-determines the block arrangement (Step S17). Moreover, if the block arrangement determination unit 10b outputs the intra prediction as the block information 1 (Step S14; No), the block arrangement judgment unit 106b selects the intra prediction. The correction unit 15b outputs to the encoding unit 20 the block information 2 determined by the block arrangement judgment unit 106b for each block included in a single frame. The encoding unit 20 receives input of the video, the QP, and the block information 2, and encodes the video. The encoding unit 20 outputs the encoded bit stream.

As shown in FIG. 9, even in a moving image encoding device that cannot perform bidirectional prediction, by adding the correction unit 15b having the bidirectional prediction unit 101, the compression ratio can be improved with a small amount of calculation. Moreover, in the case where the block arrangement determination unit 10b, the correction unit 15b, and the encoding unit 20 are executed by different devices, the encoding processing can be pipelined, and the throughput of the moving image encoding processing is improved. For example, the configuration of the moving image encoding device 1b is such that the block arrangement determination unit 10b can be realized by NVENC, the correction unit 15 by the processor core of the GPU, and the encoding unit 20 by the CPU (Central Processing Unit).

Patent Document 1 discloses a conversion device that converts the bit rate of encoded video information at high speed. In response to a problem that image quality deteriorates when complex images continue in an image encoding device that encodes image data, Patent Document 2 discloses a process that realizes an excellent encoding amount distribution in the images in consideration of visual characteristics.

PRIOR ART DOCUMENTS

Patent Documents

[Patent Document 1] Japanese Unexamined Patent Application, First Publication No. 2010-161818
[Patent Document 2] Japanese Unexamined Patent Application, First Publication No. 2009-071520

Non-Patent Documents

[Non-Patent Document 1] JTCVC-S1002, "High efficiency video coding (HEVC) test model 16 (HM16) improved encoder description"
[Non-Patent Document 2] NVIDIA, "NVIDIA VIDEO CODEC SDK", [online], [Searched on December 20, H30 (2018)], Internet (URL: https://developer.nvidia.com/nvidia-video-codec-sdk)
[Non-Patent Document 3] L. Haglund, "The SVT high definition multi format test set", 2006.

SUMMARY OF THE INVENTION

Problem to be Solved by the Invention

As described with reference to FIG. 9 and FIG. 10, bidirectional prediction can be realized by the correction processing of the correction unit 15b. However, the block information 2 output in the moving image encoding device 1b illustrated in FIG. 9 to the encoding unit 20 tends to differ from the block information from a device that includes a bidirectional prediction unit 101, such as the moving image encoding device 1a illustrated in FIG. 7. That is to say, the block arrangement configuration differs depending on whether the bidirectional prediction unit 101, from the start, performs the processing in consideration of inter-frame prediction that uses a future frame, or not (the case of using the processing result of the unidirectional prediction unit 102 described in FIG. 10).

Next, the difference in this block arrangement will be described with reference to FIG. 11. FIG. 11 shows the difference that appears in block arrangement depending on whether bidirectional prediction is used or not when encoding the video data disclosed in Non-Patent Document 3 by means of the moving image encoding device 1a illustrated in FIG. 7. It can be seen from FIG. 11 that the case where bidirectional prediction is performed differs from the case where the bidirectional prediction is not performed in that (a) there are fewer blocks with intra prediction and (b) there are more larger blocks. The number of intra prediction blocks regarding (a) is thought to decrease because bidirectional prediction being available for use makes it robust against occlusion. Also, the block size regarding (b) is thought to be such that the accuracy of the prediction image is improved by the bidirectional prediction, making the deterioration of the image quality less likely to occur even when a larger block is selected. The difference in block arrangement as shown in FIG. 11 cannot be avoided when the configuration illustrated in FIG. 9 is used, and the compression ratio is lowered as compared with the case where encoding is performed using the moving image encoding device 1a.

If the correction unit 15b does not use the processing result of the unidirectional prediction unit 102 or the processing result of the unidirectional prediction unit 103, it is necessary to perform bidirectional prediction again, which causes a significant increase in the amount of calculation.

The present invention provides a moving image encoding device, a moving image compression device, a moving image encoding method, and a program capable of solving the above problems.

Means for Solving the Problem

According to one example aspect of the present invention, a moving image encoding device includes: a parameter correction unit that corrects an encoding parameter for encoding a moving image; a block arrangement determination unit that determines block information used for encoding the moving image; and an encoding unit that encodes the moving image, the block arrangement determination unit acquires the corrected encoding parameter, and determines and outputs the block information, and the encoding unit encodes the moving image by using the encoding parameter before correction and the block information output by the block arrangement determination unit.

According to one example aspect of the present invention, a moving image compression device includes: a parameter correction unit that corrects an encoding parameter for encoding a moving image; and a block arrangement determination unit that determines block information used for encoding the moving image, the block arrangement determination unit uses the encoding parameter corrected by the parameter correction unit to output, without having a bidirectional prediction executed, the block information similar to block information when a bidirectional prediction is executed in motion prediction processing.

According to one example aspect of the present invention, a moving image encoding method comprising steps of: correcting an encoding parameter used for encoding a moving image; acquiring the corrected encoding parameter and determining block information to be used for encoding the moving image; and encoding the moving image by using the encoding parameter before correction and the block information.

According to one example aspect of the present invention, a program causes a computer to execute processing of: correcting an encoding parameter used for encoding a moving image; acquiring the corrected encoding parameter and determining block information to be used for encoding the moving image; and encoding the moving image by using the encoding parameter before correction and the block information.

Effect of the Invention

According to the moving image encoding device, the moving image encoding method, and the program described above, it is possible to improve the compression ratio of moving images without reducing the processing speed.

EXAMPLE EMBODIMENT

Hereinafter, an example embodiment of the present invention will be described, with reference to the drawings.

Description of Configuration

Figure 1:
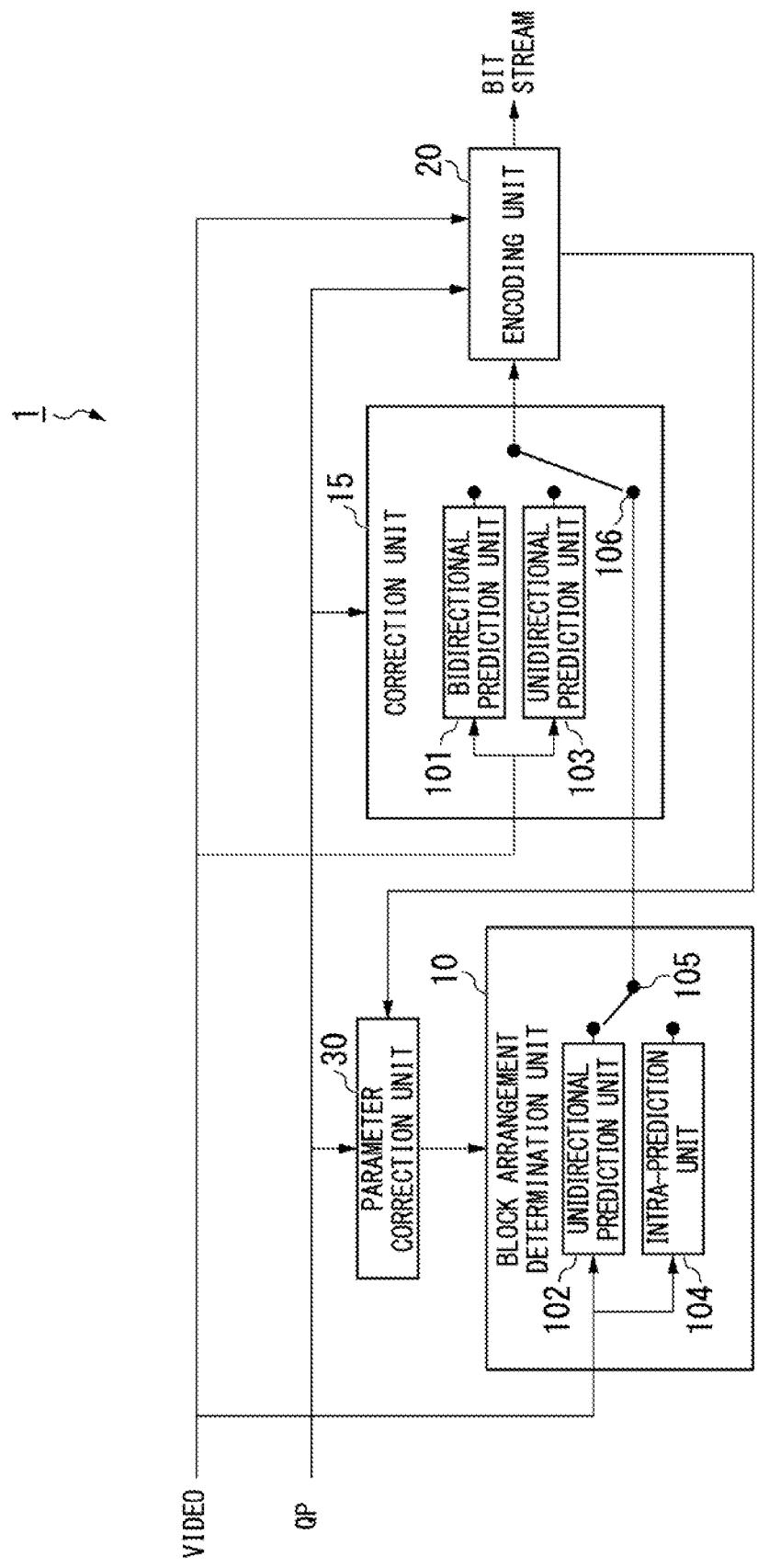
FIG. 1 is a block diagram showing an example of a moving image encoding device according to an example embodiment of the present invention.

FIG. 1 is a block diagram showing an example of a moving image encoding device according to the example embodiment of the present invention.

As shown in FIG. 1, a moving image encoding device 1 includes a block arrangement determination unit 10, a correction unit 15, an encoding unit 20, and a parameter correction unit 30.

The block arrangement determination unit 10 includes a unidirectional prediction unit 102, an intra prediction unit 104, and a block arrangement judgment unit 105.

The unidirectional prediction unit 102 receives input of corrected QP and video, and performs forward prediction on the basis of a past frame. The corrected QP will be described later.

The intra prediction unit 104 receives input of the corrected QP and the video and performs intra prediction.

The block arrangement judgment unit 105 selects either unidirectional prediction 1 or intra prediction. The block arrangement judgment unit 105 outputs the selected block mode (unidirectional prediction 1 or intra prediction) and the block size (such as 8×8, 16×16, 32×32, and 64×64) as block information 1.

The correction unit 15 includes a bidirectional prediction unit 101, a unidirectional prediction unit 103, and a block arrangement judgment unit 106.

The bidirectional prediction unit 101 performs bidirectional prediction on the basis of a past frame and a future frame. The bidirectional prediction unit 101 can perform bidirectional prediction by correcting the block information output by the block arrangement determination unit 10 in which the unidirectional prediction 1 is selected (using the processing result of the unidirectional prediction unit 102).

The unidirectional prediction unit 103 performs backward prediction on the basis of a future frame.

The block arrangement judgment unit 106b selects one of the intra prediction, the unidirectional prediction 1, the unidirectional prediction 3, and the bidirectional prediction, and outputs block information 2 that includes the selected prediction and the block size to the encoding unit 20.

The encoding unit 20 receives input of the block information output from the correction unit 15, a QP, and a video, and encodes the video according to the block arrangement information indicated by the block information 2.

The parameter correction unit 30 receives input of a parameter required for encoding and encoding history information of the encoding unit 20, and calculates a parameter to be input to the block arrangement determination unit 10. The QP is an example of the parameter required for encoding. The QP is originally a parameter used for quantization and is for adjusting bit rate, however, when QP is changed, the block arrangement also changes. Next, the relationship between parameter correction and block arrangement will be described with reference to FIG. 2.

Figure 2:
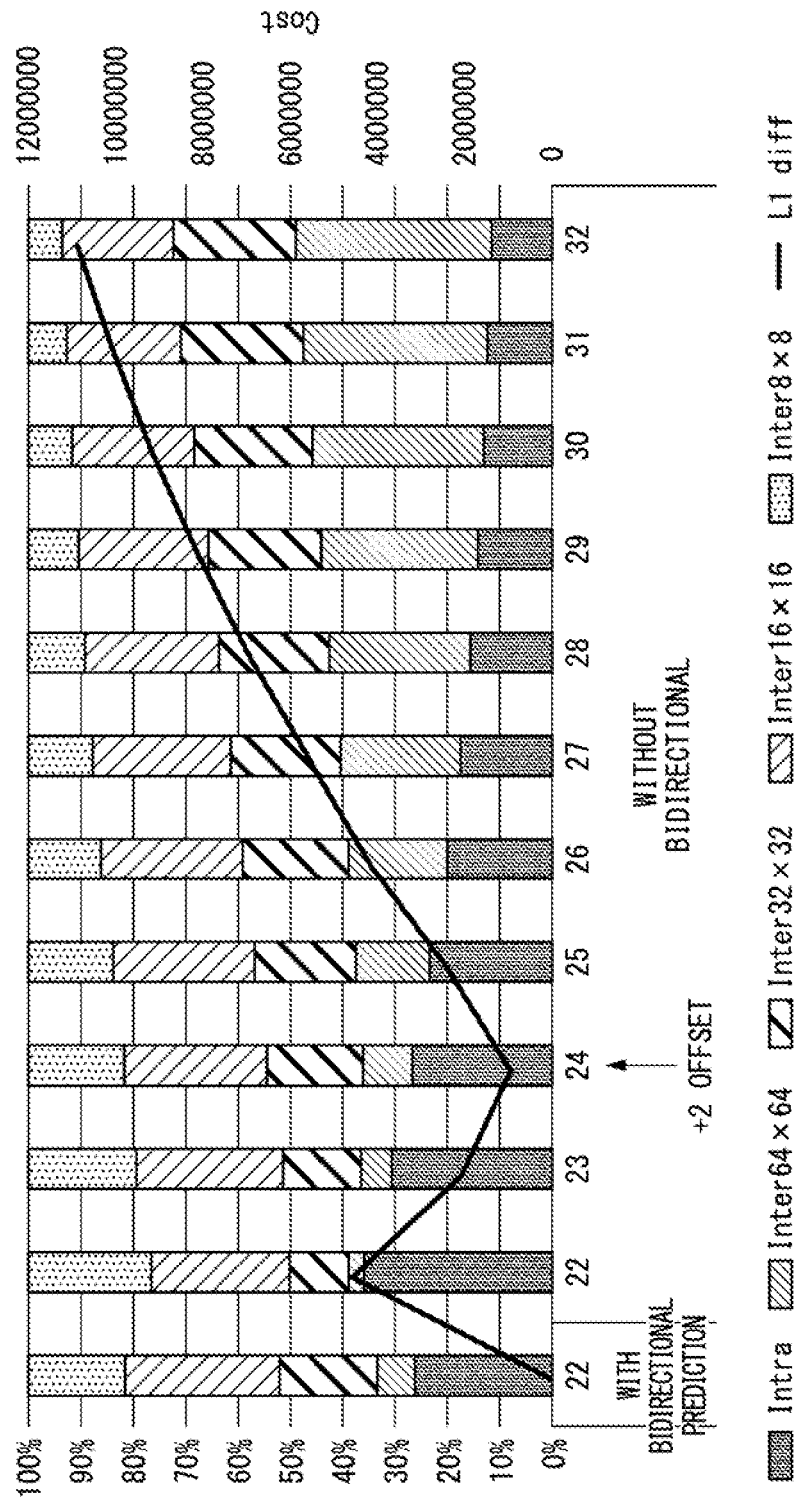
FIG. 2 is an explanatory diagram showing a relationship between QP and block arrangement where bidirectional prediction is not performed.

FIG. 2 shows the relationship between the QP and the block arrangement when encoding the video data disclosed in Non-Patent Document 3 by means of the moving image encoding device 1a. Note that $L1_{diff}$ is used as an index to evaluate the similarity in block arrangement, representing L1 norm of the difference in the area of each block when "bidirectional prediction is performed" and when "bidirectional prediction is not performed", and is expressed as the following equation where a is the area of the block.

$$L1_{diff} = \text{abs}(a_{intra\ with\ bidirectional} - a_{intra\ without\ bidirectional}) + \text{abs}(a_{inter64\times64\ with\ bidirectional} - a_{inter64\times64\ without\ bidirectional}) + \text{abs}(a_{inter32\times32\ with\ bidirectional} - a_{inter32\times32\ without\ bidirectional}) + \text{abs}(a_{inter16\times16\ with\ bidirectional} - a_{inter16\times16\ without\ bidirectional}) + \text{abs}(a_{inter8\times8\ with\ bidirectional} - a_{inter8\times8\ without\ bidirectional}) \quad (2)$$

With reference to FIG. 2, it can be seen that the difference in each area is the smallest when the QP is offset by +2, and there is a similarity in the tendency of the block arrangement. Since the optimum offset amount differs depending on the input video, estimation is made using the feature amount peculiar to the input video such as the feature of the input video and the encoding history. If the QP given to the block arrangement determination unit 10 is appropriately offset, the block arrangement output can be made similar to that in the case where bidirectional prediction is performed. This indicates that the compression ratio can be improved as in the case where bidirectional prediction is performed by giving the optimally corrected QP and executing a unidirectional prediction.

Description of Operation

Next, the operation of the moving image encoding device 1 of the present example embodiment will be described with reference to FIG. 3.

Figure 3:
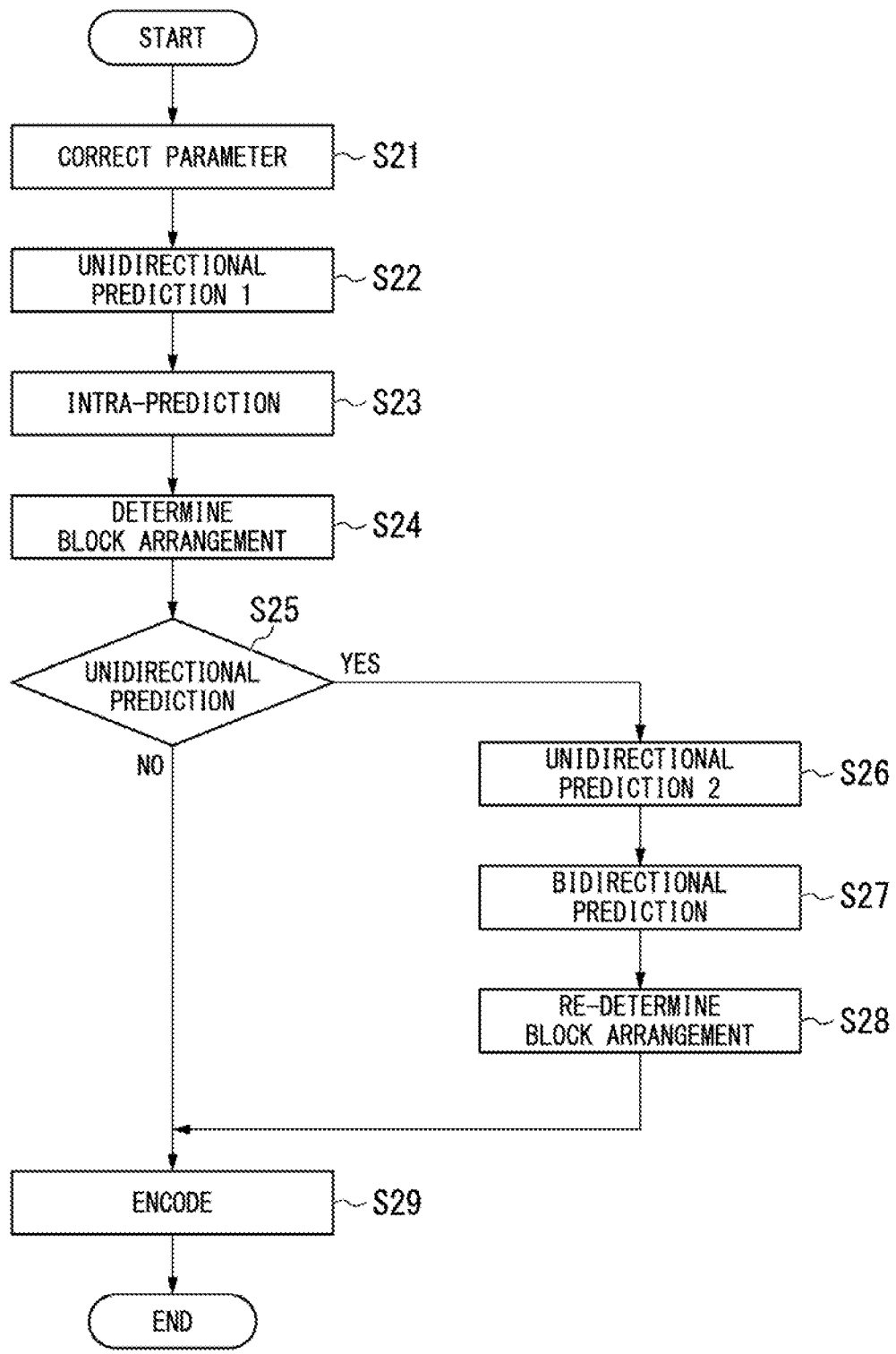
FIG. 3 is a flowchart showing an operation example of the moving image encoding device according to the example embodiment of the present invention.

FIG. 3 is a flowchart showing an operation example of the moving image encoding device according to the example embodiment of the present invention.

First, the parameter correction unit 30 receives input of a parameter and an encoding history, and corrects the parameter (QP) to be input to the block arrangement determination unit 10 (Step S21). The detailed operation of the parameter correction unit 30 will be described later.

Next, the unidirectional prediction unit 102 performs a unidirectional prediction 1 (Step S22). For example, the unidirectional prediction 1 is an inter-frame prediction (forward prediction) using a past frame.

Next, the intra prediction unit 104 performs an intra prediction (Step S23). Note that the order of the unidirectional prediction 1 and the intra prediction is not limited to this example, and may be reversed. Moreover, the unidirectional prediction 1 and the intra prediction can be processed in parallel.

The block arrangement judgment unit 105 selects the unidirectional prediction 1 or the intra prediction, and determines the block arrangement (Step S24). The block arrangement judgment unit 105 outputs block information 1 that includes information on the determined block arrangement. For the selection of the block mode, a block mode that minimizes the RD cost may be selected, using Equation (1) for example. Alternatively, more simply, a block mode that minimizes the cost may be selected, using only D, which indicates the image quality index, of the RD cost.

If the unidirectional prediction 1 is selected in the block arrangement determination unit 10 (Step S25: Yes), the process proceeds to the correction process in the correction unit 15. If intra prediction is selected (Step S25: No), the process proceeds to the encoding process of Step S29.

If the unidirectional prediction 1 is selected in the block arrangement determination unit 10, the unidirectional prediction unit 103 executes the unidirectional prediction 2 (Step S26). For example, the unidirectional prediction 2 is an inter-frame prediction (backward prediction) using a future frame.

Next, the bidirectional prediction unit 101 executes a bidirectional prediction (Step S27). Note that when calculating a bidirectional prediction from the start, the order of the unidirectional prediction 2 and the bidirectional prediction is not limited to this example, and parallel processing is also possible. In the case where, in the bidirectional prediction, the calculation is performed from the middle using the processing results (such as motion vector) of the unidirectional prediction 1 in Step S22 and the unidirectional prediction 2 in Step S26, the order shown in FIG. 3 is required. In the case where the bidirectional prediction is performed using the processing results of unidirectional prediction 1 and unidirectional prediction 2, the amount of calculation can be reduced.

Next, in the correction unit 15, the block arrangement judgment unit 106 selects one of the unidirectional prediction 1, the unidirectional prediction 2, and the bidirectional prediction, and re-determines the block arrangement (Step S26). As with the block arrangement determination unit 10, the selection of the block mode is realized by minimizing the RD cost or the cost equivalent thereto. If intra prediction is selected in the block arrangement determination unit 10, the block arrangement judgment unit 106 selects intra prediction for the block.

The correction unit 15 outputs block information 2 that includes the block mode and block size of each block to the encoding unit 20. The encoding unit 20 acquires the block information 2 and performs the encoding process.

According to the present example embodiment, the block arrangement output by the block arrangement determination unit 10, for which bidirectional prediction cannot be used, can be made similar to that when bidirectional prediction is performed. As a result, the compression ratio of the video can be improved. Moreover, the calculation of the parameter QP requires a small amount of calculation, and also the correction unit 15 can correct the block arrangement output by the block arrangement determination unit 10 without re-performing the block determination (inter prediction). Therefore, the compression ratio can be improved without reducing the processing speed.

Next, the parameter correction process will be described. The output of the block arrangement determination unit 10, for which only unidirectional prediction can be used, is different from the block arrangement output by a block arrangement determination unit for which bidirectional prediction can be used. However, as described with reference to FIG. 2, by correcting the encoding parameter (for example, QP) and giving it to the block arrangement determination unit 10, it is possible to approximate the output thereof to the output of the block arrangement determination unit 10a when bidirectional prediction is performed. Since the optimum offset width differs depending on the input information, the parameter correction unit 30 needs to calculate the optimum offset width.

As a method of calculating an offset value whose optimum value differs depending on the input information, a method that uses machine learning may be used. For example, it can be found by means of a multiple linear regression analysis where the encoding history such as block size, block mode, or bit amount are used as an explanatory variable and the QP value or offset width is used as a responsive variable. For example, learning data (for example, for each feature and type of video, encoding history information such as block size, block mode, or bit amount, and a QP value that makes, without bidirectional prediction, a block configuration similar to that when bidirectional prediction is performed (FIG. 2)) are accumulated and relationships therebetween are learned preliminarily. In the case of multiple linear regression analysis, the prediction function is linear, and the parameter correction unit 30 can correct parameters with a light calculation amount even in the case of actually encoding a moving image.

Note that a block configuration similar to that when bidirectional prediction is performed without bidirectional prediction means that, the difference between the configuration ratio of "Intra", "Inter64×64", "Inter32×32", "Inter16×16", and "Inter 8×8" when bidirectional prediction is performed and the configuration ratio of those when bidirectional prediction is not performed falls within a predetermined allowable range, for example.

Another Configuration Example

In the configuration example of FIG. 1, the block arrangement determination unit 10 has the unidirectional prediction unit 102 and the intra prediction unit 104, and the correction unit 15 has the unidirectional prediction unit 103 and the bidirectional prediction unit 101. However, the configuration is not limited to this example, and the block arrangement determination unit 10 may have the unidirectional prediction unit 103 and the intra prediction unit 104, and the correction unit 15 may have the unidirectional prediction unit 102 and the bidirectional prediction unit 101. The operation in the case of this configuration is similar to that described in FIG. 3 except that Step S22 and Step S26 in FIG. 3 are exchanged.

Figure 4:
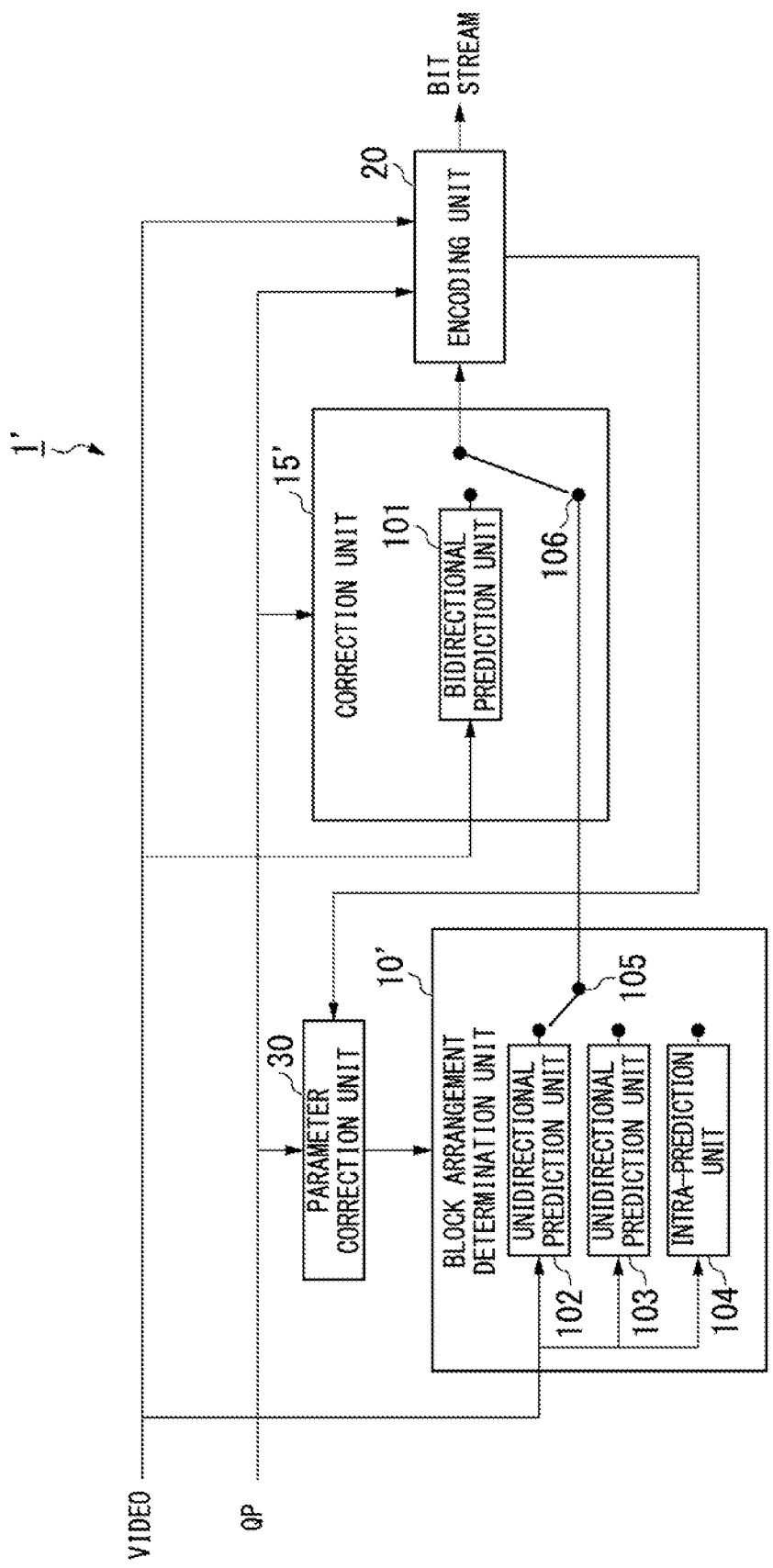
FIG. 4 is a block diagram showing another example of the moving image encoding device according to the example embodiment of the present invention.

Moreover, as illustrated in FIG. 4, a moving image encoding device 1' may include a block arrangement determination unit 10', a correction unit 15', the encoding unit 20, and the parameter correction unit 30; the block arrangement determination unit 10' may include the unidirectional prediction unit 102, the unidirectional prediction unit 103, and the intra prediction unit 104; and the correction unit 15' may include the bidirectional prediction unit 101.

In the operation of this configuration, the parameter correction unit 30 first corrects the QP and outputs it to the block arrangement determination unit 10'. In the block arrangement determination unit 10', the unidirectional prediction unit 102, the unidirectional prediction unit 103, and the intra prediction unit 104 perform unidirectional prediction 1, unidirectional prediction 2, and intra prediction, respectively, in an arbitrary order or in a parallel processing manner. Next, the block arrangement judgment unit 105 selects one of the block modes on the basis of the RD cost and so forth, and outputs block information 1 to the correction unit 15'. In the case where the unidirectional prediction 1 or the unidirectional prediction 2 is selected, the bidirectional prediction unit 101 performs bidirectional prediction in the correction unit 15'. The correction unit 15' selects one of the unidirectional prediction 1, the unidirectional prediction 2, the bidirectional prediction, and the intra prediction for each block, and outputs block information 2 to the encoding unit 20.

In either of the configurations illustrated in FIG. 1 and FIG. 4, the block arrangement determination units 10, 10' need not include the intra prediction unit 104.

Description of Effect

In the present example embodiment, the parameter correction unit 30 corrects parameters to be input to the block arrangement determination unit 10 for which only one-directional prediction can be used. As a result, the block arrangement determined by the block arrangement determination unit 10 becomes similar to the block arrangement determined by the block arrangement determination unit 10a for which bidirectional prediction can be used, and the compression ratio can be improved as compared with the moving image encoding device 1b shown in FIG. 9 that uses general techniques.

Figure 7:
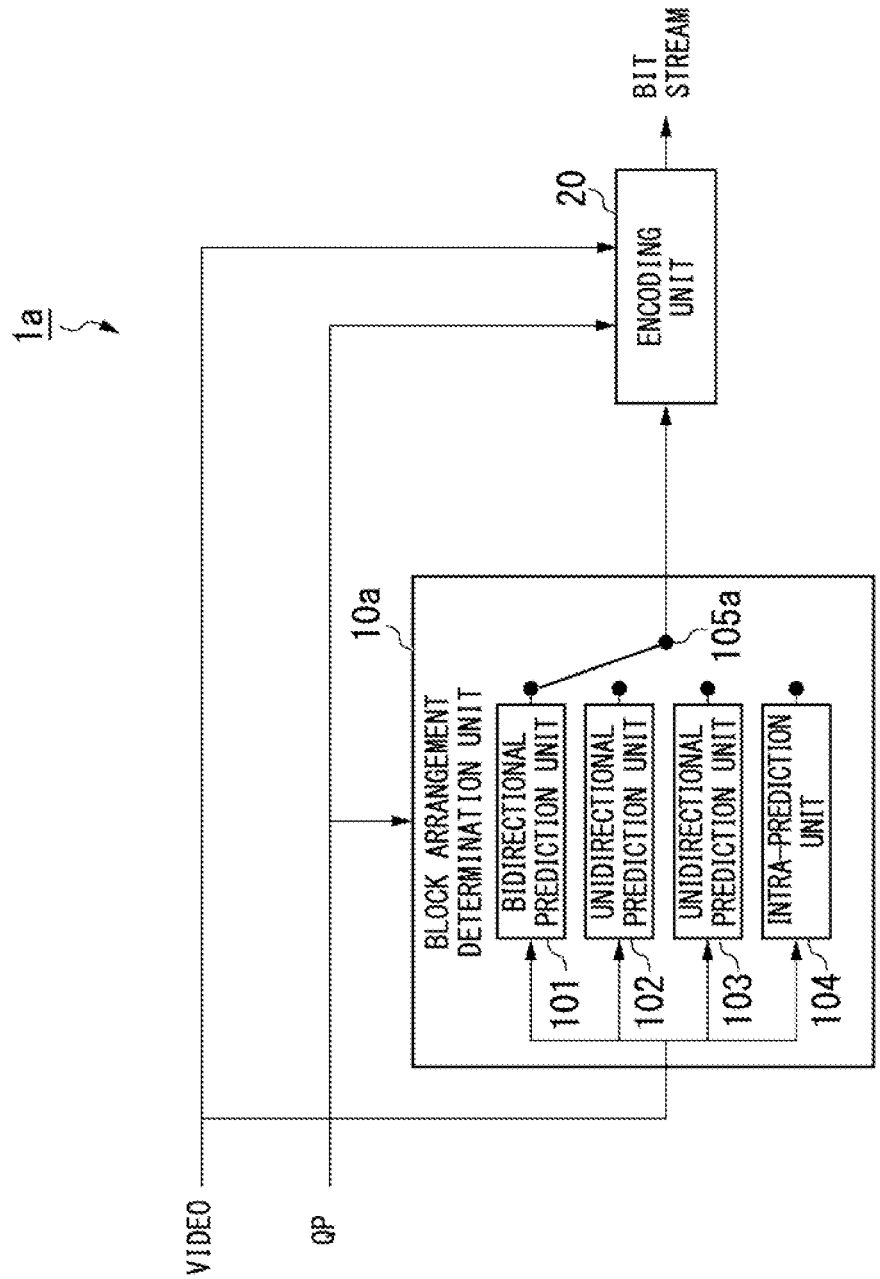
FIG. 7 is a block diagram showing a general moving image encoding device.
Figure 8:
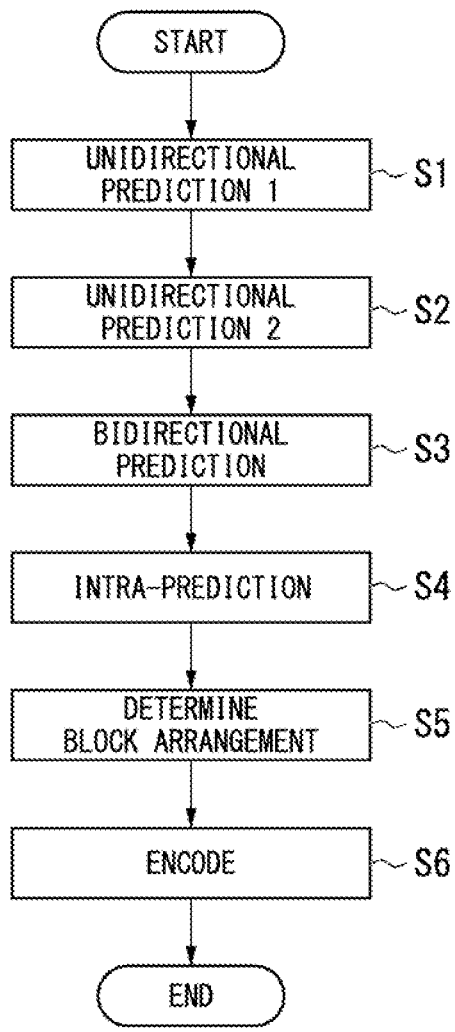
FIG. 8 is a flowchart showing operations of the moving image encoding device illustrated in FIG. 7.

Furthermore, in the present example embodiment, parameter correction performed by the parameter correction unit 30 is realized with a light calculation amount, and when the block arrangement determination unit 10 and other constituent elements are executed by separate devices, a pipeline may be configured to enable an increase in the processing speed as compared with the general moving image encoding device 1a shown in FIG. 7.

Next, a specific configuration example of the moving image encoding device 1 will be described.

Figure 5:
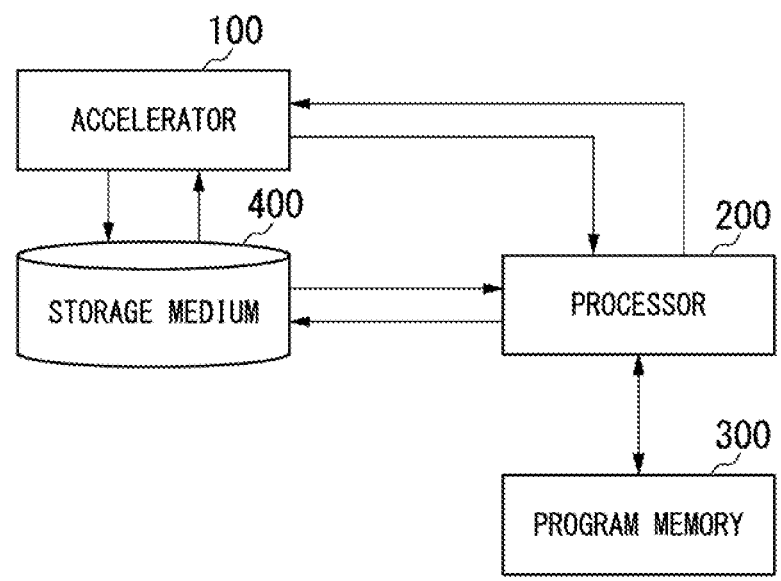
FIG. 5 is a block diagram showing a configuration example of an information processing device capable of realizing the functions of the moving image encoding device according to the example embodiment of the present invention.

FIG. 5 is a block diagram showing a configuration example of an information processing device capable of realizing the functions of the moving image encoding device according to the present invention.

The information-processing device shown in FIG. 5 includes an accelerator 100, a processor 200, a program memory 300, and a storage medium 400 for storing an input moving image, an output bit stream, and data undergoing calculations.

In the information-processing device shown in FIG. 5, the accelerator 100 has the function of the block arrangement determination unit 10 among the blocks shown in FIG. 1, and the program memory 300 stores a program for realizing other functions. The accelerator 100 executes the block arrangement determination process, and the processor 200 executes the process according to the program stored in the program memory 300, thereby realizing the functions of the moving image encoding device shown in FIG. 1. Here, the program memory 300 is a magnetic disk, a magnetic optical disk, a CD-ROM, a DVD-ROM, a semiconductor memory, or the like. Moreover, the program may be distributed to a computer via a communication line, and the computer having received the distributed program may execute the program. Also, the above program may be a program for realizing some of the functions described above. Furthermore, the program may be a so-called difference file (a difference program) which can realize the functions described above in combination with a program already recorded in the computer system.

While an example of using the accelerator 100 has been shown as a device for realizing the block arrangement determination unit 10, the invention is not limited to this example in those cases where the block arrangement determination unit 10; and the correction unit 15 and the encoding unit 20 are separate devices.

Figure 6:
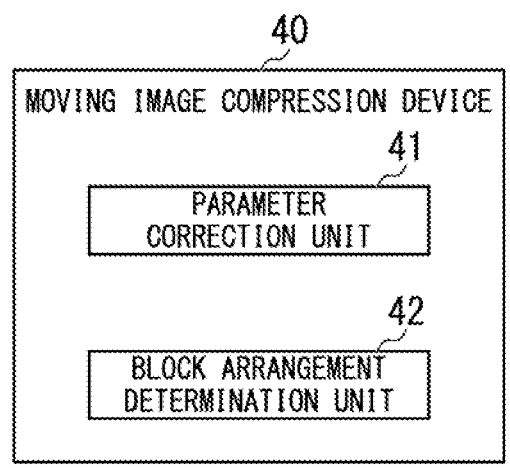
FIG. 6 is a diagram showing a minimum configuration of a moving image compression device according to the example embodiment of the present invention.

FIG. 6 is a diagram showing a minimum configuration of a moving image compression device according to the example embodiment of the present invention.

As shown in FIG. 6, a moving image compression device 40 includes at least a parameter correction unit 41 and a block arrangement determination unit 42.

The parameter correction unit 41 corrects encoding parameters for encoding a moving image. For example, the parameter correction unit 41 corrects an encoding parameter QP on the basis of encoding history information (configuration of block size, block mode, bit amount, and block arrangement) for each feature and type (scenery, character, target in motion, and so forth) of the moving image to be encoded.

The block arrangement determination unit 42 determines and outputs block information for encoding a moving image. The block arrangement determination unit 42 uses the encoding parameter corrected by the parameter correction unit 41, and outputs, without having bidirectional prediction executed, block information similar to that output when bidirectional prediction is executed.

According to the moving image compression device 40, the compression ratio of a moving image can be improved without increasing the amount of calculation by optimizing the encoding parameters. More specifically, it is possible without increasing the amount of computation to solve the difference occurring in block arrangement depending on whether bidirectional prediction is performed or not, and improve the compression ratio.

Figure 9:
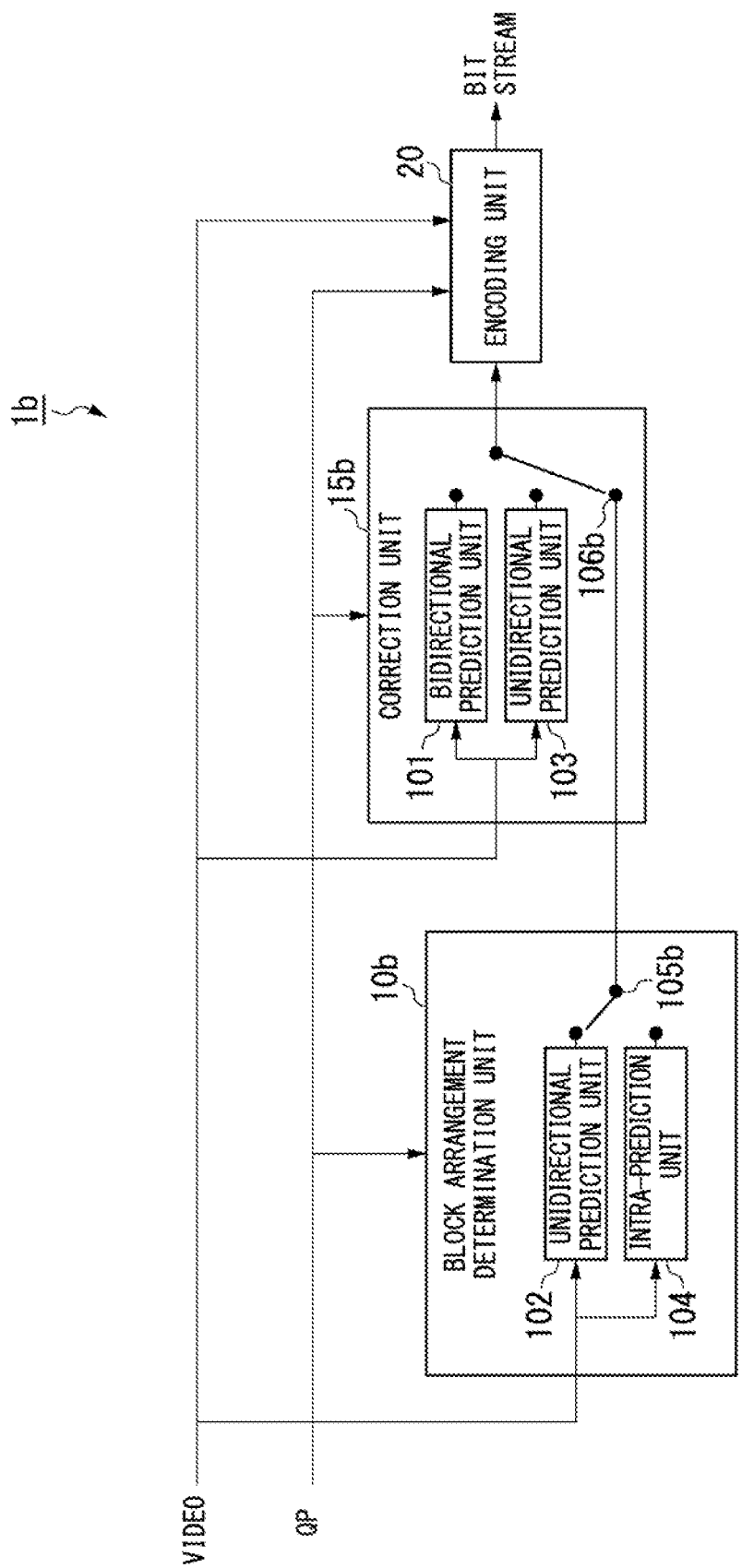
FIG. 9 is a block diagram showing a general moving image encoding device.
Figure 10:
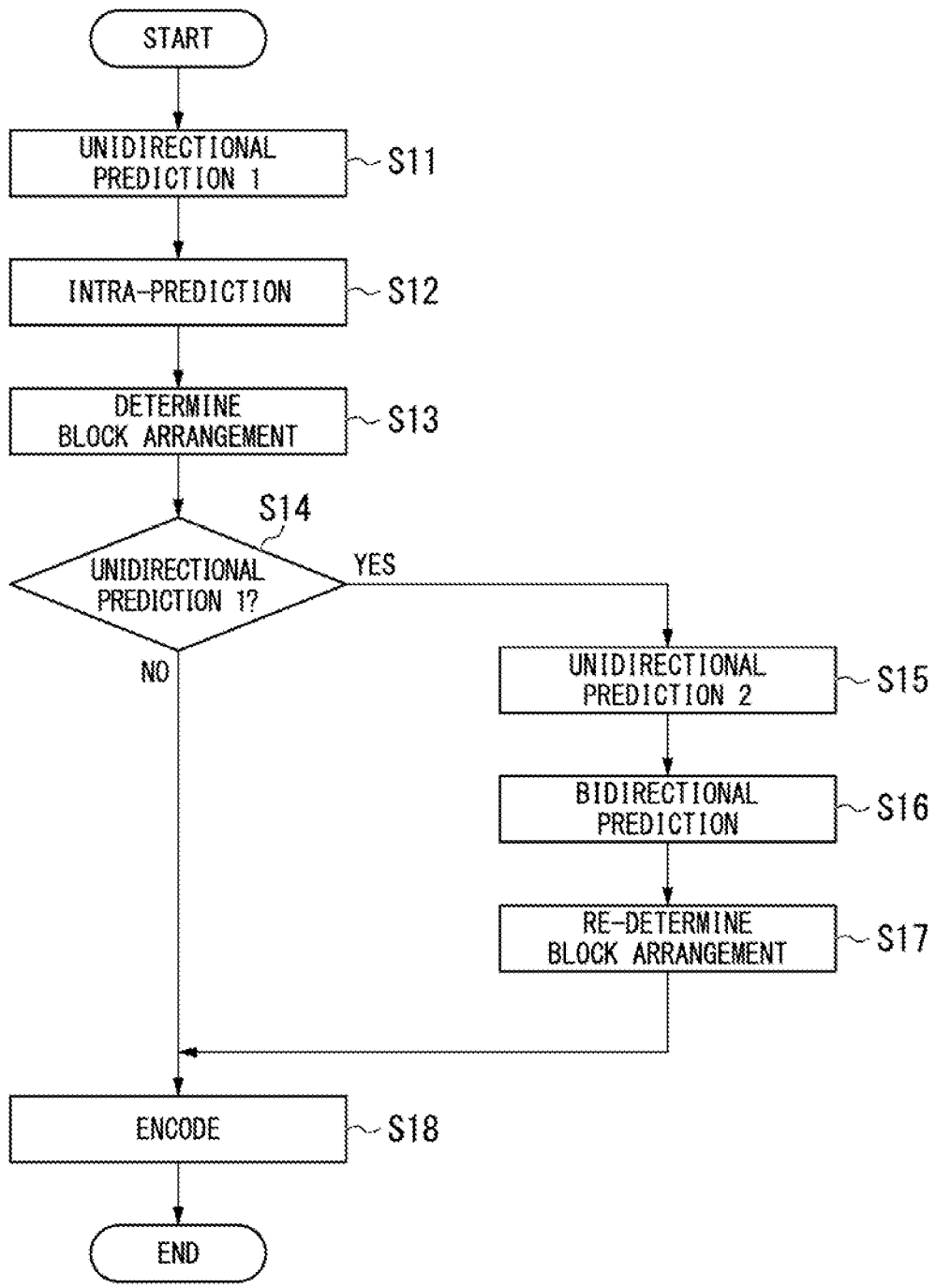
FIG. 10 is a flowchart showing operations of the moving image encoding device illustrated in FIG. 9.
Figure 11:
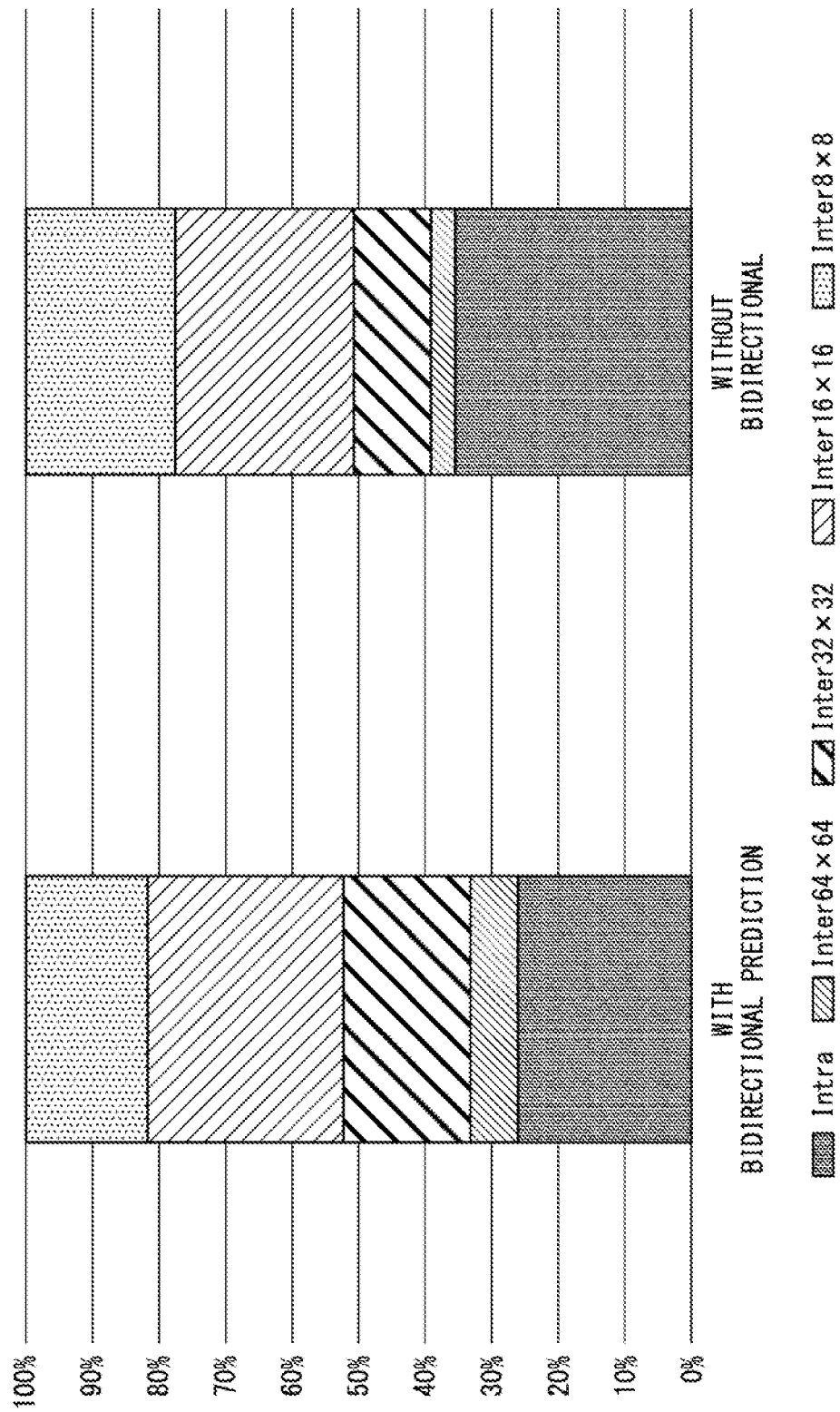
FIG. 11 is an explanatory diagram showing a difference in block arrangement depending on whether bidirectional prediction is performed or not.

Furthermore, by correcting the block information output from the moving image compression device 40 by means of the correction unit 15 capable of executing bidirectional prediction, and performing encoding in accordance with the corrected block arrangement information by means of the encoding unit 20, it is possible to output a bit stream having a compression ratio higher than that in the case of the moving image encoding device 1*b* illustrated in FIG. 9.

Since the moving image compression device 40 can improve the compression ratio without increasing the amount of calculation, it can be suitably applied to an imaging system, a transcoding system, or the like that require high resolution processing.

Furthermore, it is possible to appropriately replace the constituent elements in the above example embodiments with known constituent elements without departing from the spirit of the present invention. The technical scope of the present invention is not limited to the example embodiments described above, and various modifications may be made without departing from the spirit of the present invention.

INDUSTRIAL APPLICABILITY

According to the moving image encoding device, the moving image encoding method, and the program described above, it is possible to improve the compression ratio of moving images without reducing the processing speed.

REFERENCE SYMBOLS

1, 1*a*, 1*b* Moving image encoding device
10, 10', 10*a*, 10*b* Block arrangement determination unit
101 Bidirectional prediction unit
102 Unidirectional prediction unit
103 Unidirectional prediction unit
104 Intra-prediction unit
105, 105*a*, 105*b* Block arrangement judgment unit
15, 15', 15*b* Correction unit
106, 106*b* Block arrangement judgment unit
20 Encoding unit
30 Parameter correction unit
40 Moving image compression device
41 Parameter correction unit
42 Block arrangement determination unit
100 Accelerator
200 Processor
300 Program memory
400 Storage medium

What is claimed is:

1. A moving image encoding device comprising:
a first processor; and
a second processor,
wherein the first processor is configured to execute first instructions to:
add an offset value to an encoding parameter which is calculated in advance so that a block arrangement is similar to a case where a bidirectional prediction is executed without executing the bidirectional prediction; and
correct the encoding parameter for encoding a moving image so that block information output by the second processor is similar to the block information in the case where the bidirectional prediction is executed without executing the bidirectional prediction, and
wherein the second processor is configured to execute second instructions to:
acquire the corrected encoding parameter;
determine the block information used for encoding the moving images; and
output the block information,
wherein the first processor is configured to execute the first instructions to encode the moving image by using the encoding parameter before correction and the outputted block information.

2. The moving image encoding device according to claim 1, wherein the first processor is configured to execute the first instructions to correct the encoding parameter by using past encoding history information.

3. The moving image encoding device according to claim 1,
wherein the encoding parameter is a quantization parameter (QP),
the block information includes a block mode and a block size, and
the block mode and the block size are corrected by correcting the QP.

4. The moving image encoding device according to claim 1,
wherein the first processor is configured to execute the first instructions to execute the bidirectional prediction in motion prediction processing, the first processor is configured to execute the first instructions to acquire the block information calculated by the second processor using a one-directional prediction in motion prediction processing, and correct the block information to includes the bidirectional prediction, and the first processor is configured to execute the first instructions to perform encoding, using the block information that includes the bidirectional prediction.

5. A moving image compression device comprising:

a first processor; and a second processor, wherein the first processor is configured to execute first instructions to:

add an offset value to an encoding parameter which is calculated in advance so that a block arrangement is similar to a case where a bidirectional prediction is executed without executing the bidirectional prediction; and correct the encoding parameter for encoding a moving image so that block information output by the second processor is similar to the case where the bidirectional prediction is executed without executing the bidirectional prediction, and wherein the second processor is configured to execute second instructions to:

determine the block information used for encoding the moving image, and wherein the second processor is configured to execute the second instructions to use the corrected encoding parameter to output the block information that is similar to the case where the bidirectional prediction is executed in motion prediction processing without having the bidirectional prediction executed.

6. A moving image encoding method comprising:

Adding an offset value to an encoding parameter which is calculated in advance so that a block arrangement is similar to a case where a bidirectional prediction is executed without executing the bidirectional prediction;

correcting the encoding parameter used for encoding a moving image so that block information output by a second processor is similar to the case where the bidirectional prediction is executed without executing the bidirectional prediction;

acquiring the corrected encoding parameter and determining the block information to be used for encoding the moving image; and encoding the moving image by using the encoding parameter before correction and the block information.

* * * * *